(12) United States Patent
Silverbrook et al.

(10) Patent No.: US 7,295,343 B2
(45) Date of Patent: Nov. 13, 2007

(54) DIGITAL PHOTO ALBUM WITH IMAGE MODIFICATION AND INTERNAL PRINTING

(75) Inventors: Kia Silverbrook, Balmain (AU); Tobin Allen King, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 754 days.

(21) Appl. No.: 10/636,214

(22) Filed: Aug. 8, 2003

(65) Prior Publication Data

US 2004/0027590 A1  Feb. 12, 2004

Related U.S. Application Data

(63) Continuation of application No. 10/040,471, filed on Jan. 9, 2002.

(30) Foreign Application Priority Data

Jan. 17, 2001 (AU) .................... PR2563

(51) Int. Cl.
G06F 15/00 (2006.01)
(52) U.S. Cl. .............. 358/1.9; 358/1.2; 358/304; 348/207.2
(58) Field of Classification Search .......... 358/1.2, 358/1.9, 304; 348/207.2
See application file for complete search history.

(56) References Cited

U.S. PATENT DOCUMENTS

| 5,443,320 | A | * | 8/1995 | Agata et al. ............ 400/715 |
| 6,016,184 | A | * | 1/2000 | Haneda ..................... 355/36 |
| 6,072,586 | A | * | 6/2000 | Bhargava et al. ......... 358/1.15 |
| 6,074,111 | A | | 6/2000 | Kasahara et al. |
| 6,115,137 | A | | 9/2000 | Ozawa et al. |
| 6,229,621 | B1 | | 5/2001 | Kulakowski et al. |
| 6,552,743 | B1 | * | 4/2003 | Rissman ................ 348/207.2 |
| 6,552,821 | B2 | | 4/2003 | Suzuki |
| 6,573,927 | B2 | * | 6/2003 | Parulski et al. ............ 348/32 |
| 6,597,468 | B1 | * | 7/2003 | Inuiya ..................... 358/1.15 |
| 6,710,892 | B2 | * | 3/2004 | Narushima .............. 358/1.13 |
| 6,867,882 | B1 | | 3/2005 | Takahashi |
| 7,068,308 | B2 | | 6/2006 | Feldis, III |

FOREIGN PATENT DOCUMENTS

| DE | 10001768 A1 | 8/2000 |
| EP | 1129388 | 5/2000 |
| JP | 07-307956 | 11/1995 |
| JP | 10-229533 | 8/1998 |
| JP | 11-164184 | 6/1999 |
| JP | 2000-284370 | 10/2000 |
| JP | 2001-008153 | 1/2001 |
| KR | 0227042 | 10/1999 |
| WO | WO 99/04368 | 1/1999 |
| WO | WO 0023279 A1 * | 4/2000 |
| WO | WO 00/28379 A | 5/2000 |

* cited by examiner

Primary Examiner—Douglas Q. Tran
Assistant Examiner—Chan S. Park

(57) ABSTRACT

A digital photo album 901 has image enhancement provided by a pre-programmed set of characteristics on a removable image enhancement card and includes a body section 902 connected to a display screen 904. The body 902 houses control circuitry for operating the digital photo album and an internal printer 500 for printing displayed images. The printer 500 has a removable ink/print media cartridge 504 and prints images of equal size to those displayed.

20 Claims, 12 Drawing Sheets

DIGITAL PHOTO ALBUM WITH IMAGE MODIFICATION AND INTERNAL PRINTING

CROSS REFERENCES TO RELATED APPLICATIONS

The present application is a continuation of U.S. application Ser. No. 10/040,471 filed on Jan. 9, 2002.

BACKGROUND OF THE INVENTION

The following invention relates to a digital photo album with an internal printer. More particularly though not exclusively, the invention relates to a digital photo album having a pagewidth drop-on-demand ink jet printhead and a source of print media located in the body of the digital photo album.

A digital photo album is typically a portable electronic device that receives an electronic memory card on which is stored one or more digital images. A card reader inside the digital photo album retrieves image data from the card and displays an image on an electronic display screen forming part of the digital photo album.

Digital photo albums thus provide a convenient way for transporting digital images in a manner that allows for their quick and spontaneous display. Furthermore, digital photo albums can include image manipulation software that modify stored images in accordance with a programmed set of characteristics. These image enhancement techniques can be used to create artistic effects as well as enabling the addition of text, labels, etc. Image enhancement can also be by way of removing unwanted portions of an image such as obvious dirt marks and by making rotational and vibrational corrections. Examples of image processing hardware can be found in our co-pending application U.S. Ser. No. 09/112,786 the contents of which is duly incorporated herein by reference. Examples of image processing software can be found in our co-pending applications U.S. Ser. Nos. 09/113,070, 09/112,777, 09/113,224, 09/112,804, 09/112,797, 09/112,796, 09/113,071, 09/113,091, 09/112,753, 09/113,055, 09/113,057 and 09/113,054 the contents of which are duly incorporated herein by reference.

Much of the benefit of such portable prior art photo albums is lost however if a print-out of any one or more images is required. To print an image, prior art digital photo albums must be connected to a print device compatible with the photo album which requires additional cabling to be carried thus reducing the portability of the photo album. Alternatively the digital storage medium that stores the images within the digital photo album can be transferred to another computer having compatible software for reading the images and which is connected to a printer. Each of the above alternatives can only be implemented if these other computing devices are readily at hand. The prior art digital photo albums are thus yet to reach their maximum potential as a functional medium for transporting digital images.

OBJECTS OF THE INVENTION

It is an object of the present invention to overcome or substantially ameliorate at least one of the above disadvantages.

It is another object of the present invention to provide a digital photo album having image enhancement capabilities and an in-built printer.

It is a further object of the present invention to provide a digital photo album with image enhancement from which an enhanced printed image can be obtained without connecting the digital photo album to additional computing or printing devices.

It is a still further object of the present invention to provide a digital photo album with image enhancement having an in-built printer capable of printing a photo-sized image.

DISCLOSURE OF THE INVENTION

There is disclosed herein a digital photo album including digital image storage means, means for modifying a stored image, image display means for electronically displaying a modified image, in-built printer means for printing a modified image and image control means permitting a user to selectively display and print modified images stored by said image storage means.

Preferably an image is modified in accordance with a pre-programmed set of characteristics.

Preferably said pre-programmed set of characteristics are stored on a removable medium.

Preferably digital images are stored on a removable memory medium.

Preferably the printer is housed within a body of the digital photo album the body also housing an image storage medium and being connected to a display screen.

Preferably the printer includes a supply of print media within the body.

Preferably a printhead of the printer is a monolithic pagewidth printhead.

Preferably the printhead is an ink jet printhead.

Preferably the digital photo album includes a control panel including means for operating the printer.

Preferably the printer is disposed within the body such that when the digital photo album is placed on a horizontal surface the control panel is substantially inclined to the horizontal.

Preferably the body includes a releasable cover portion through which a portion of the printer including the print media and/or ink cartridge can be removed.

BRIEF DESCRIPTION OF THE DRAWINGS

The invention will now be described by way of example with reference to the accompanying diagrammatic drawings in which.

DESCRIPTION OF THE PREFERRED EMBODIMENT

Figure 1:
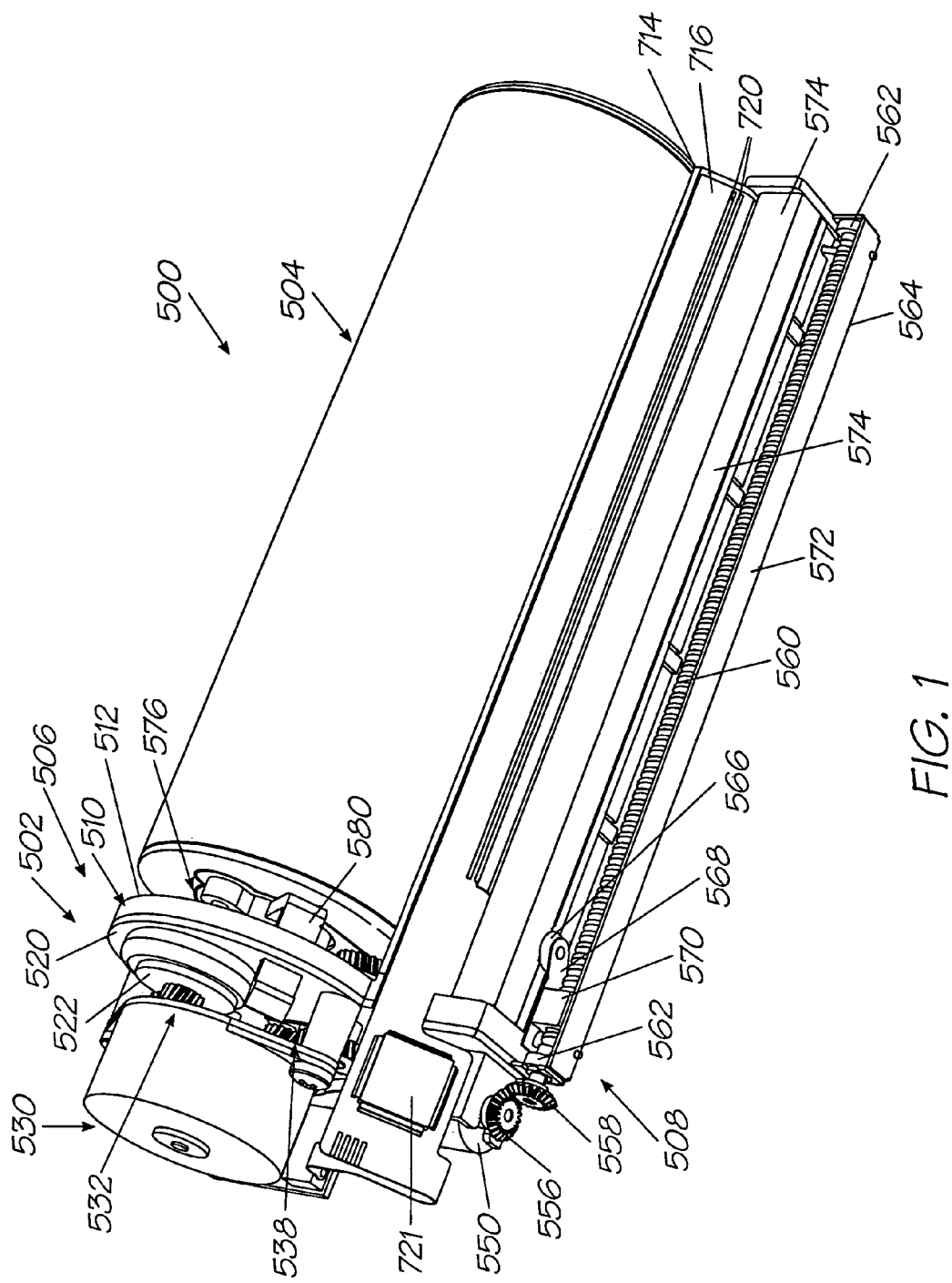
FIG. 1 shows a three dimensional view of a print engine, including components in accordance with the invention.
Figure 2:
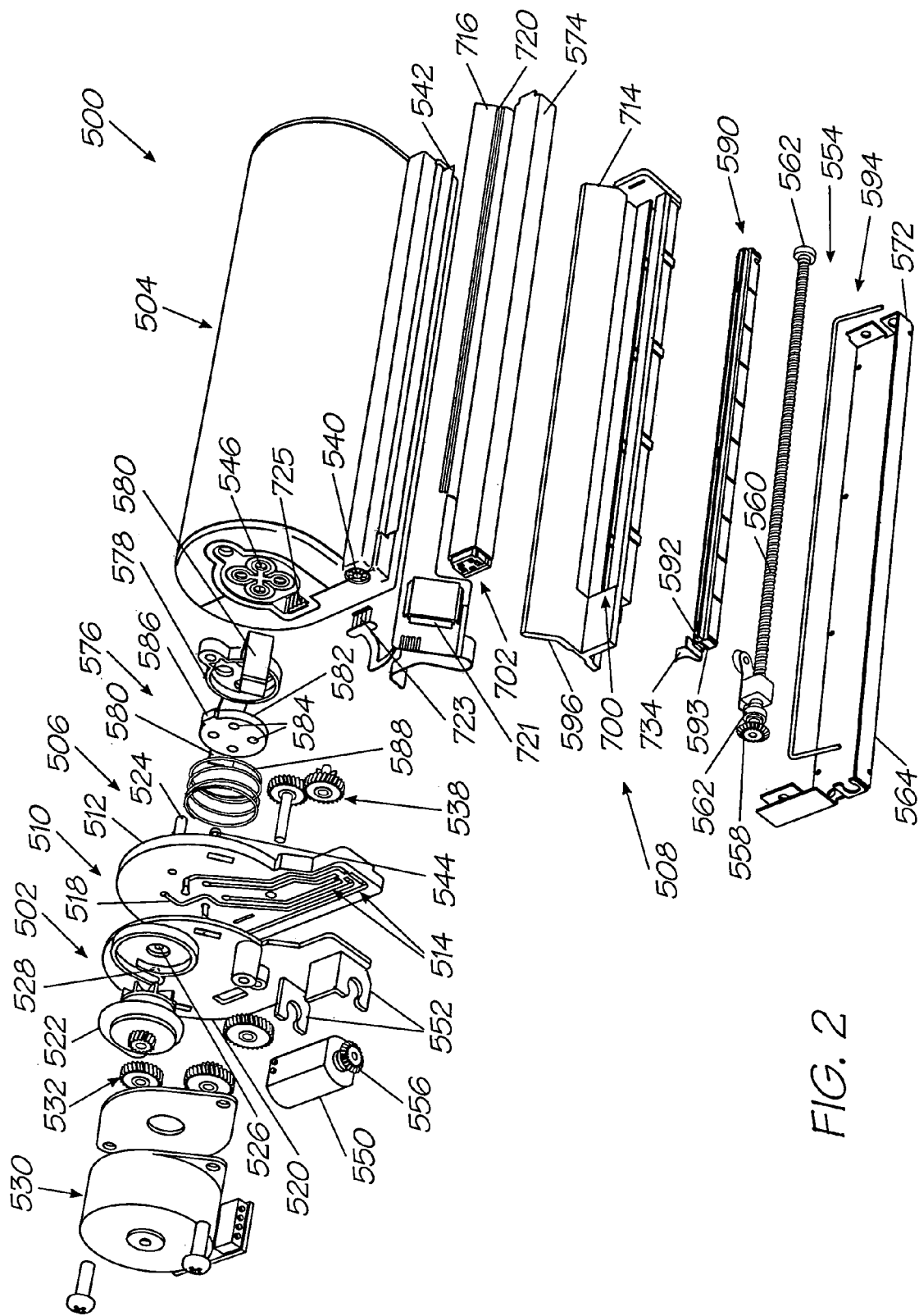
FIG. 2 shows a three dimensional, exploded view of the print engine.

In FIGS. 1 to 10 of the accompanying drawings, reference numeral 500 generally designates a print engine, in accordance with the invention. The print engine 500 includes a print engine assembly 502 on which a print roll cartridge 504 is removably mountable.

The print cartridge 504 is described in greater detail in our co-pending applications U.S. Ser. No. 09/607,993 and U.S. Ser. No. 09/607,251, the contents of that disclosure being specifically incorporated herein by reference.

The print engine assembly 502 comprises a first sub-assembly 506 and a second, printhead sub-assembly 508.

The sub-assembly 506 includes a chassis 510. The chassis 510 comprises a first molding 512 in which ink supply channels 514 are molded. The ink supply channels 514 supply inks from the print cartridge 504 to a printhead 516 (FIGS. 5 to 7) of the printhead sub-assembly 508. The printhead 516 prints in four colors or three colors plus ink which is visible in the infra-red light spectrum only (hereinafter referred to as 'infra-red ink'). Accordingly, four ink supply channels 514 are defined in the molding 512 together with an air supply channel 518. The air supply channel 518 supplies air to the printhead 516 to inhibit the build up of foreign particles on a nozzle guard of the printhead 516.

The chassis 510 further includes a cover molding 520. The cover molding 520 supports a pump 522 thereon. The pump 522 is a suction pump, which draws air through an air filter in the print cartridge 504 via an air inlet pin 524 and an air inlet opening 526. Air is expelled through an outlet opening 528 into the air supply channel 518 of the chassis 510.

The chassis 510 further supports a first drive motor in the form of a stepper motor 530. The stepper motor 530 drives the pump 522 via a first gear train 532. The stepper motor 530 is also connected to a drive roller 534 (FIG. 5) of a roller assembly 536 of the print cartridge 504 via a second gear train 538. The gear train 538 engages an engageable element 540 (FIG. 2) carried at an end of the drive roller 534. The stepper motor 530 thus controls the feed of print media 542 to the printhead 516 of the sub-assembly 508 to enable an image to be printed on the print media 542 as it passes beneath the printhead 516. It also to be noted that, as the stepper motor 530 is only operated to advance the print media 542, the pump 522 is only operational to blow air over the printhead 516 when printing takes place on the print media 542.

The molding 512 of the chassis 510 also supports a plurality of ink supply conduits in the form of pins 544 which are in communication with the ink supply channels 514. The ink supply pins 544 are received through an elastomeric collar assembly 546 of the print cartridge 504 for drawing ink from ink chambers or reservoirs 548 (FIG. 5) in the print cartridge 504 to be supplied to the printhead 516.

A second motor 550, which is a DC motor, is supported on the cover molding 520 of the chassis 510 via clips 552. The motor 550 is provided to drive a separating means in the form of a cutter arm assembly 554 to part a piece of the print media 542, after an image has been printed thereon, from a remainder of the print media. The motor 550 carries a beveled gear 556 on an output shaft thereof. The beveled gear 556 meshes with a beveled gear 558 carried on a worm gear 560 of the cutter assembly 554. The worm gear 560 is rotatably supported via bearings 562 in a chassis base plate 564 of the printhead sub-assembly 508.

The cutter assembly 554 includes a cutter wheel 566, which is supported on a resiliently flexible arm 568 on a mounting block 570. The worm gear 560 passes through the mounting block 570 such that, when the worm gear 560 is rotated, the mounting block 570 and the cutter wheel 566 traverse the chassis base plate 564. The mounting block 570 bears against a lip 572 of the base plate 564 to inhibit rotation of the mounting block 570 relative to the worm gear 560. Further, to effect cutting of the print media 542, the cutter wheel 566 bears against an upper housing or cap portion 574 of the printhead sub-assembly 508. This cap portion 574 is a metal portion. Hence, as the cutter wheel 566 traverses the capped portion 574, a scissors-like cutting action is imparted to the print media to separate that part of the print media 542 on which the image has been printed.

The sub-assembly 506 includes an ejector mechanism 576. The ejector mechanism 576 is carried on the chassis 510 and has a collar 578 having clips 580, which clip and affix the ejector mechanism 576 to the chassis 510. The collar 578 supports an insert 582 of an elastomeric material therein. The elastomeric insert 582 defines a plurality of openings 584. The openings 584 close off inlet openings of the pins 544 to inhibit the ingress of foreign particles into the pins 544 and, in so doing, into the channels 514 and the printhead 516. In addition, the insert 584 defines a land or platform 586 which closes off an inlet opening of the air inlet pin 524 for the same purposes.

Figure 3:
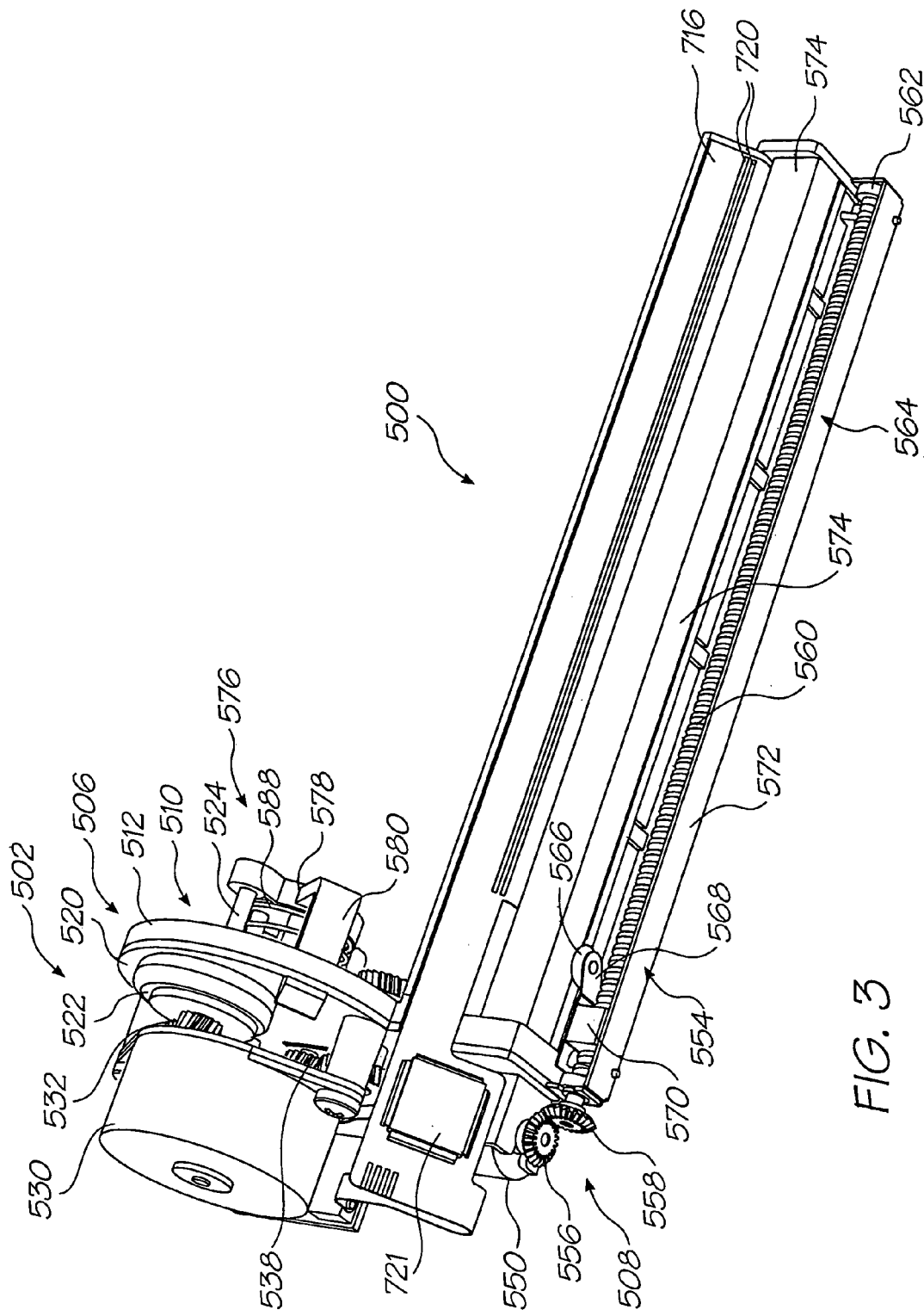
FIG. 3 shows a three dimensional view of the print engine with a removable print cartridge used with the print engine removed.
Figure 4:
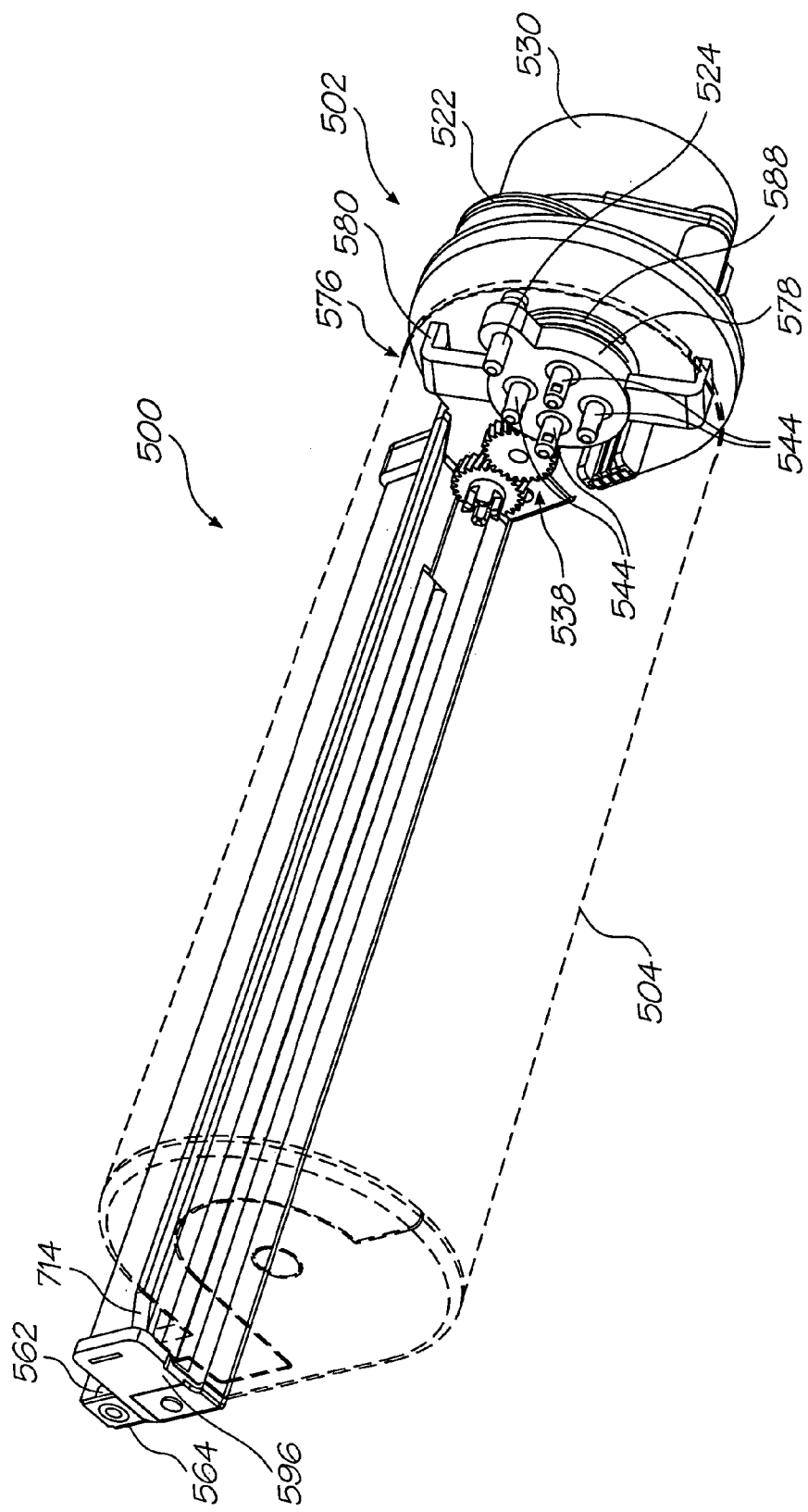
FIG. 4 shows a three dimensional, rear view of the print engine with the print cartridge shown in dotted lines.
Figure 5:
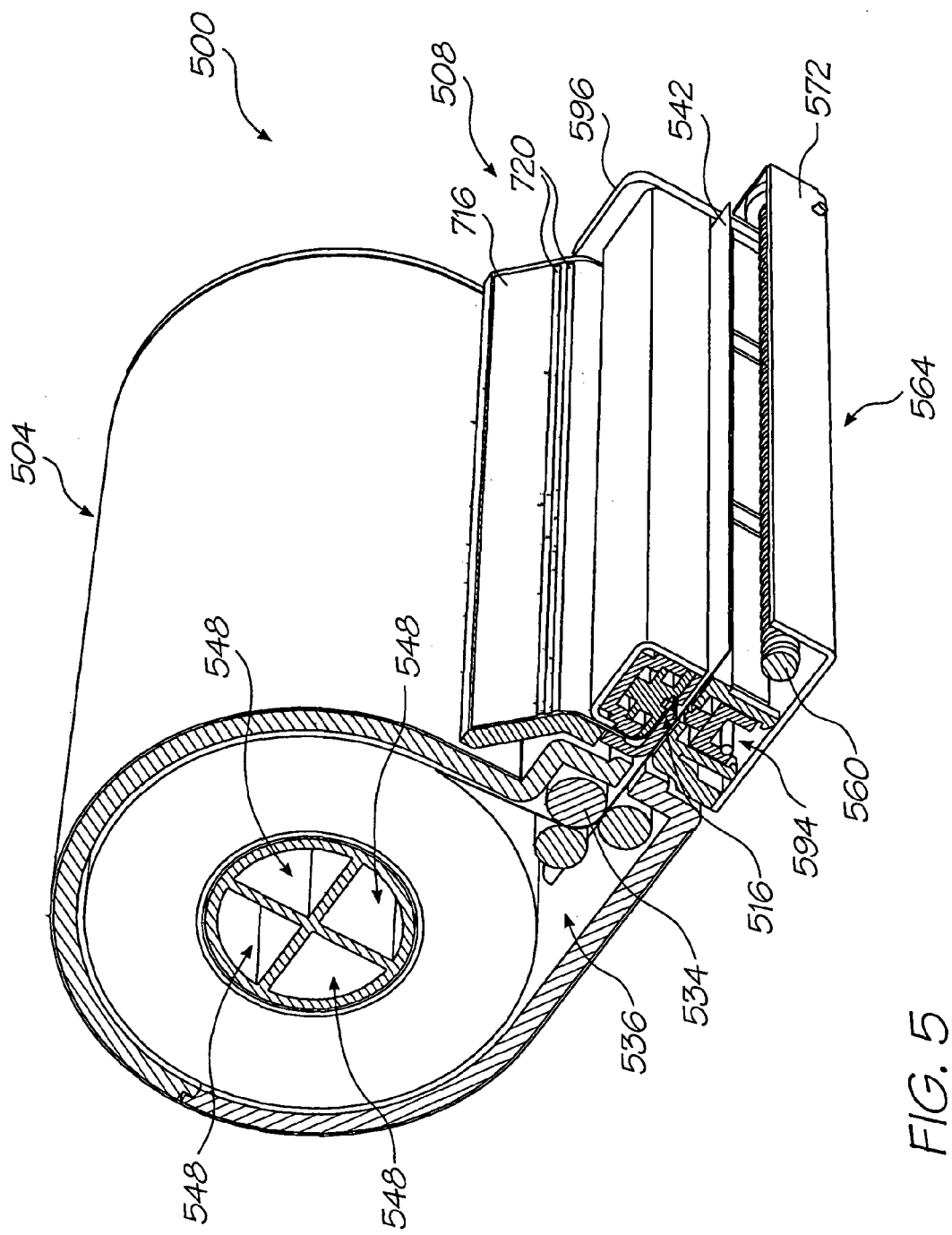
FIG. 5 shows a three dimensional, sectional view of the print engine.
Figure 6:
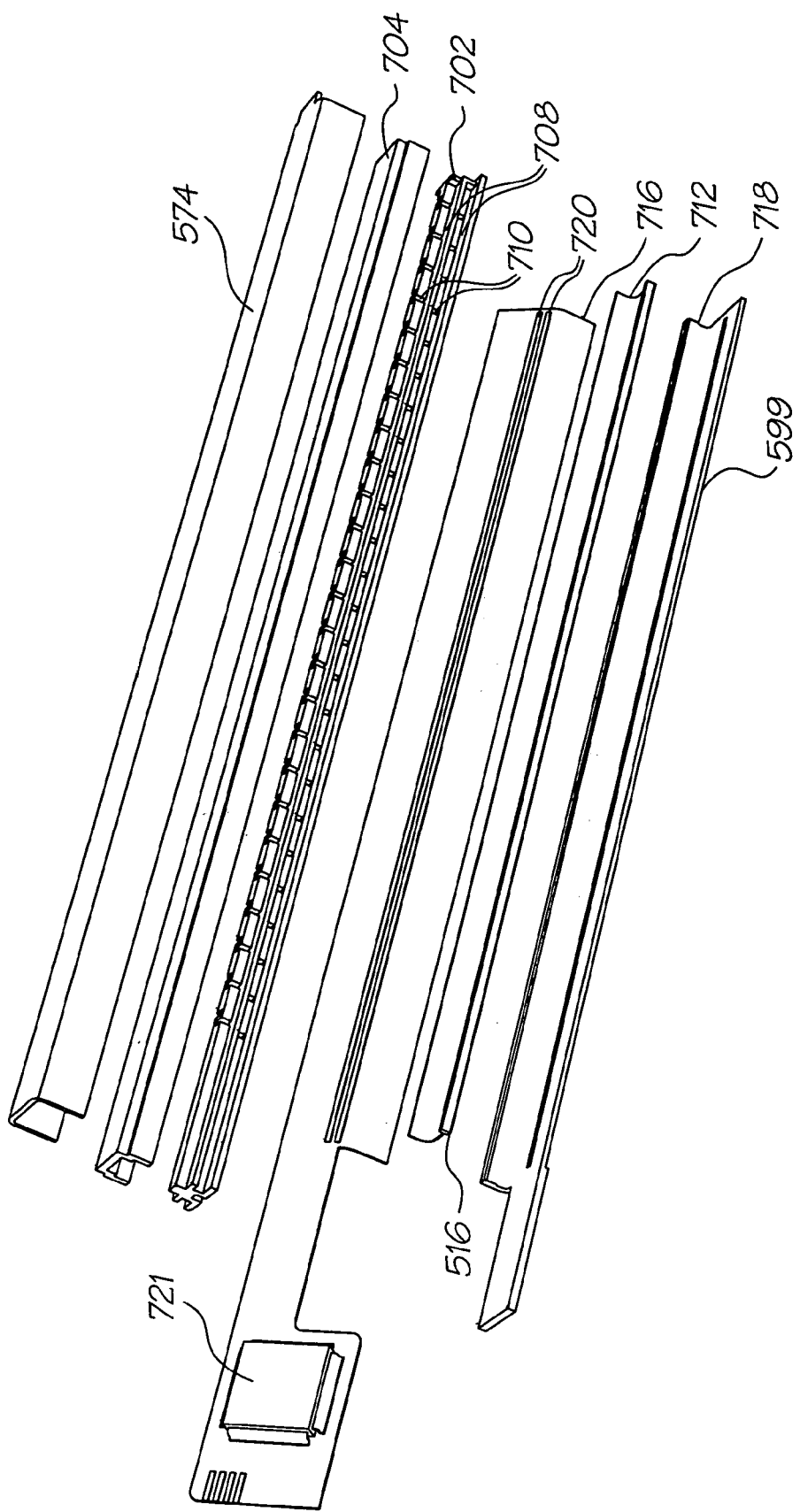
FIG. 6 shows a three dimensional, exploded view of a printhead sub-assembly of the print engine.

A coil spring 588 is arranged between the chassis 510 and the collar 578 to urge the collar 578 to a spaced position relative to the chassis 510 when the cartridge 504 is removed from the print engine 500, as shown in greater detail in FIG. 3 of the drawings. The ejector mechanism 576 is shown in its retracted position in FIG. 4 of the drawings.

The printhead sub-assembly 508 includes, as described above, the base plate 564. A capping mechanism 590 is supported displaceably on the base plate 564 to be displaceable towards and away from the printhead 516. The capping mechanism 590 includes an elongate rib 592 arranged on a carrier 593. The carrier is supported by a displacement mechanism 594, which displaces the rib 592 into abutment with the printhead 516 when the printhead 516 is inoperative. Conversely, when the printhead 516 is operational, the displacement mechanism 594 is operable to retract the rib 592 out of abutment with the printhead 516.

The printhead sub-assembly 508 includes a printhead support molding 596 on which the printhead 516 is mounted. The molding 596, together with an insert 599 arranged in the molding 596, defines a passage 598 through which the print media 542 passes when an image is to be printed thereon. A groove 700 is defined in the molding 596 through which the capping mechanism 590 projects when the capping mechanism 590 is in its capping position.

An ink feed arrangement 702 is supported by the insert 599 beneath the cap portion 574. The ink feed arrangement 702 comprises a spine portion 704 and a casing 706 mounted on the spine portion 704. The spine portion 704 and the casing 706, between them, define ink feed galleries 708 which are in communication with the ink supply channels 514 in the chassis 510 for feeding ink via passages 710 (FIG. 7) to the printhead 516.

An air supply channel 711 (FIG. 8) is defined in the spine portion 704, alongside the printhead 516.

Electrical signals are provided to the printhead 516 via a TAB film 712 which is held captive between the insert 599 and the ink feed arrangement 702.

The molding 596 includes an angled wing portion 714. A flexible printed circuit board (PCB) 716 is supported on and secured to the wing portion 714. The flex PCB 716 makes electrical contact with the TAB film 712 by being urged into engagement with the TAB film 712 via a rib 718 of the insert 599. The flex PCB 716 supports busbars 720 thereon. The busbars 720 provide power to the printhead 516 and to the other powered components of the print engine 500. Further, a camera print engine control chip 721 is supported on the flex PCB 716 together with a QA chip (not shown) which authenticates that the cartridge 504 is compatible and compliant with the print engine 500. For this purpose, the PCB 716 includes contacts 723, which engage contacts 725 in the print cartridge 504.

Figure 7:
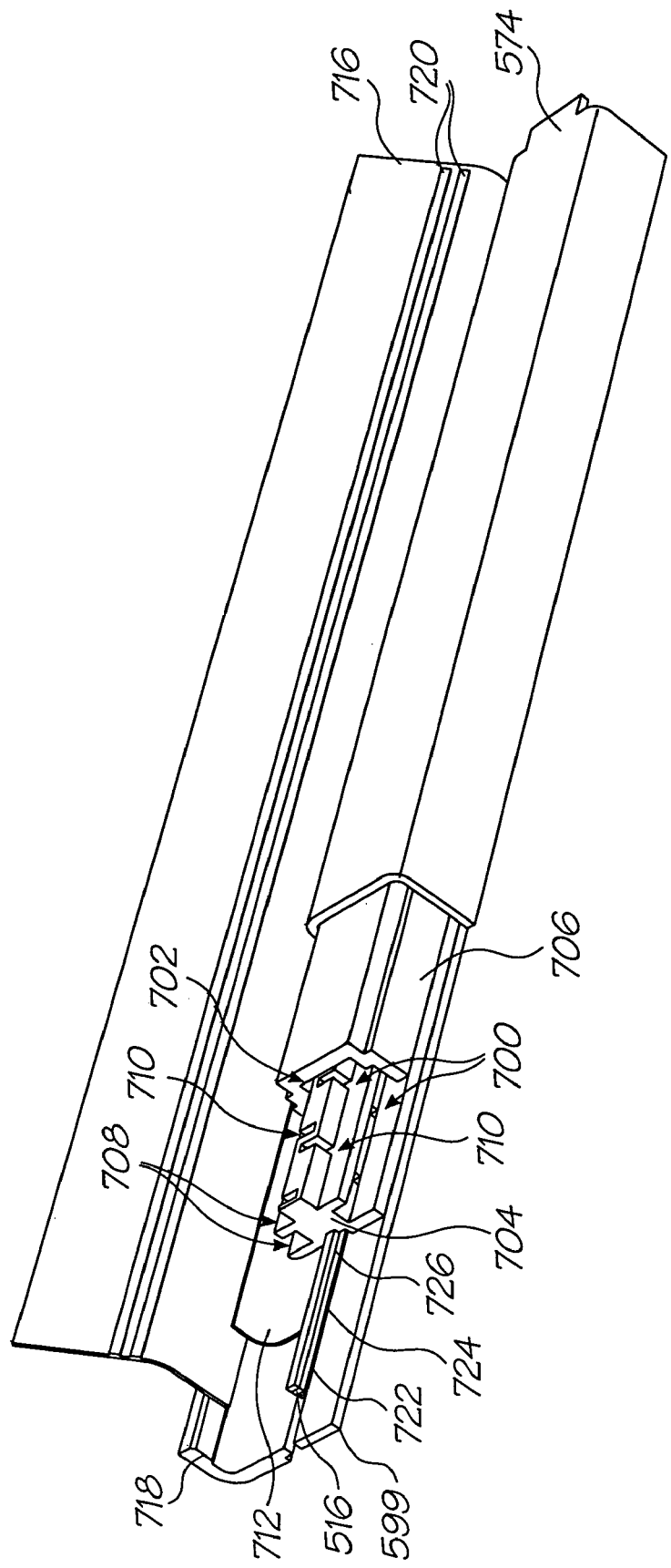
FIG. 7 shows a partly cutaway view of the printhead sub-assembly.
Figure 8:
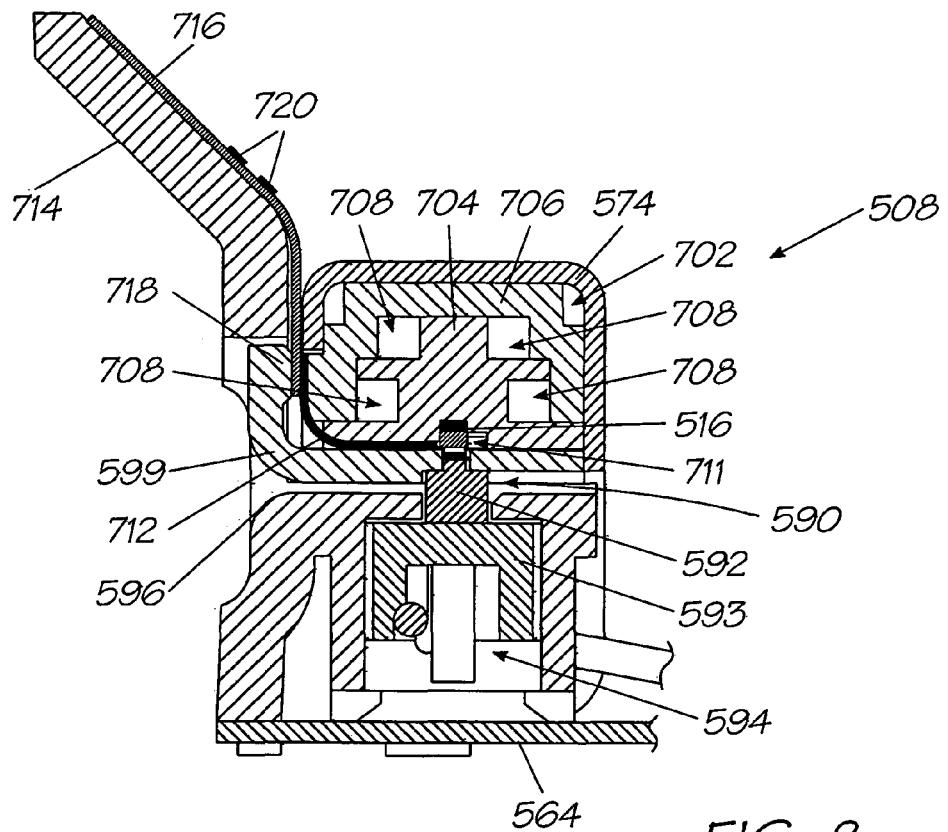
FIG. 8 shows a sectional end view of the printhead sub-assembly with a capping mechanism in a capping position.
Figure 9:
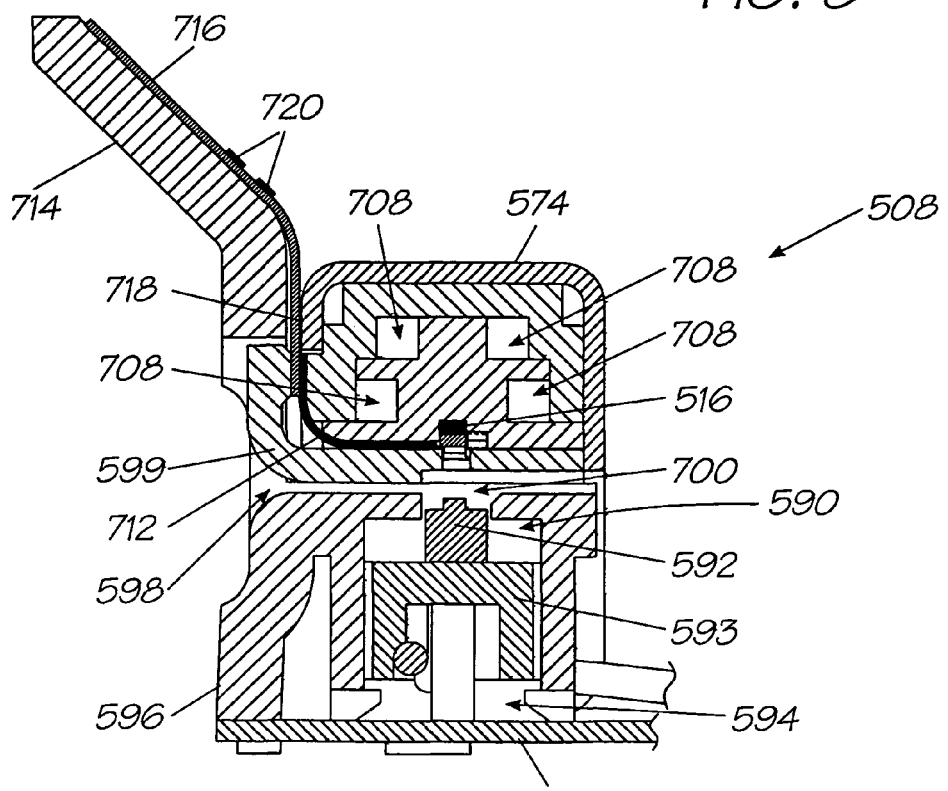
FIG. 9 shows the printhead sub-assembly with the capping mechanism in its uncapped position.

As illustrated more clearly in FIG. 7 of the drawings, the printhead itself includes a nozzle guard 722 arranged on a silicon wafer 724. The ink is supplied to a nozzle array (not shown) of the printhead 516 via an ink supply member 726. The ink supply member 726 communicates with outlets of the passages 710 of the ink feed arrangement 702 for feeding ink to the array of nozzles of the printhead 516, on demand.

Figure 10:
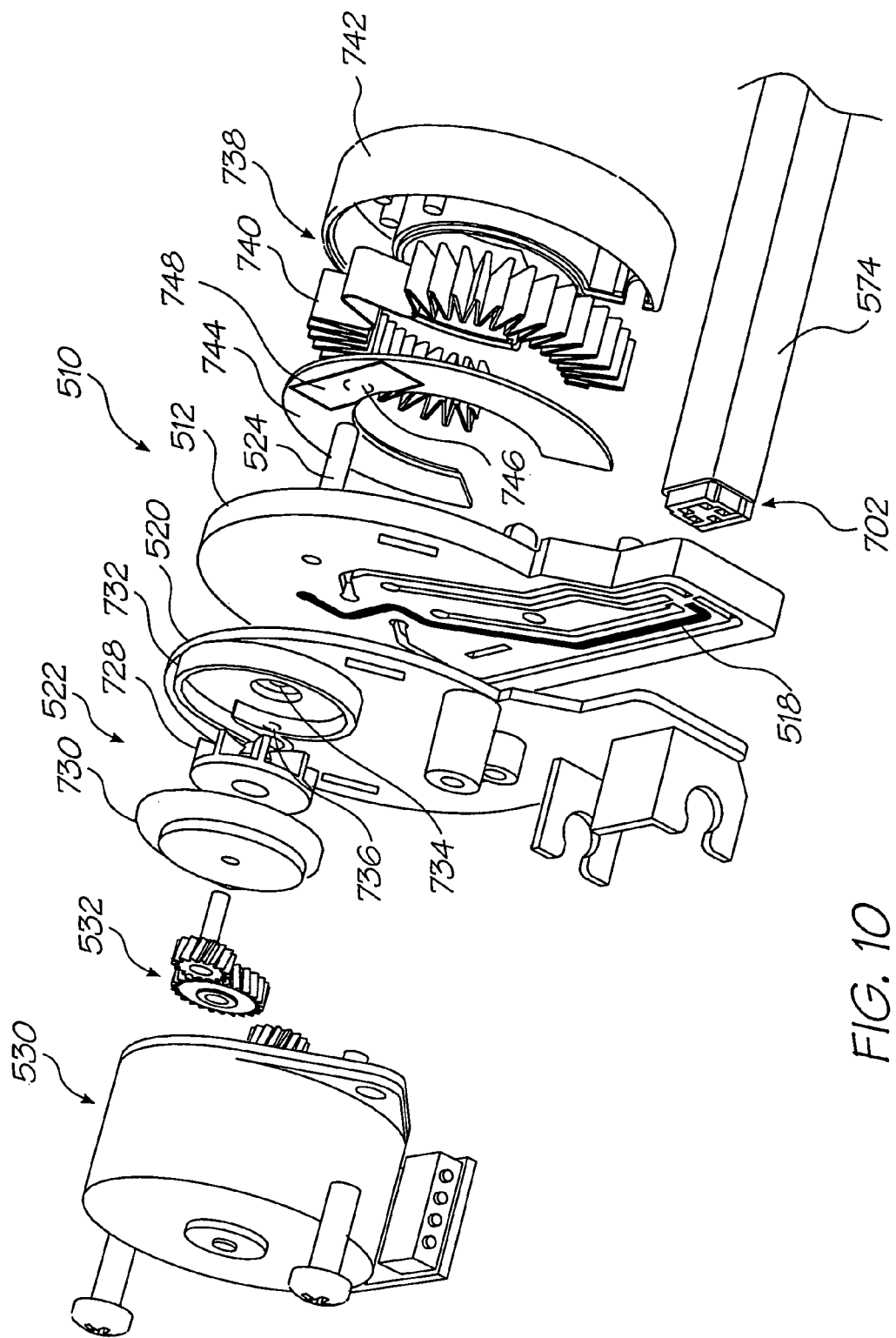
FIG. 10 shows an exploded, three dimensional view of an air supply arrangement of the print engine.

In FIG. 10, the air supply path for supplying air to the printhead 516 is shown in greater detail. As illustrated, the pump 522 includes an impeller 728 closed off by an end cap 730. The cover molding 520 of the chassis forms a receptacle 732 for the impeller 728. The cover molding 520 has the air inlet opening 734 and the air outlet opening 736. The air inlet opening 734 communicates with the pin 524. The air outlet opening 736 feeds air to the air supply channel 518 which, in FIG. 10, is shown as a solid black line. The air fed from the air supply channel 518 is blown into the printhead 516 to effect cleaning of the printhead. The air drawn in via the pump 522 is filtered by an air filter 738, which is accommodated in the print cartridge 504. The air filter 738 has a filter element 740 which may be paper based or made of some other suitable filtering media. The filter element 740 is housed in a canister, having a base 742 and a lid 744. The lid 744 has an opening 746 defined therein. The opening 746 is closed off by a film 748 which is pierced by the pin 524. The advantage of having the air filter 738 in the print cartridge 504 is that the air filter 738 is replaced when the print cartridge 504 is replaced.

It is an advantage of the invention that an air pump 522 is driven by the stepper motor 530, which also controls feed of the print media to the printhead 516. In so doing, fewer components are required for the print engine 500 rendering it more compact. In addition, as the same motor 530 is used for operating the air pump 522 and for feeding the print media 542 to the printhead 516, fewer power consuming components are included in the print engine 500 rendering it more compact and cheaper to produce.

It is also to be noted that, in order to make the print engine 500 more compact, the size of the print engine assembly 502 is such that most of the components of the assembly 502 are received within a footprint of an end of the print cartridge 504.

Figure 11:
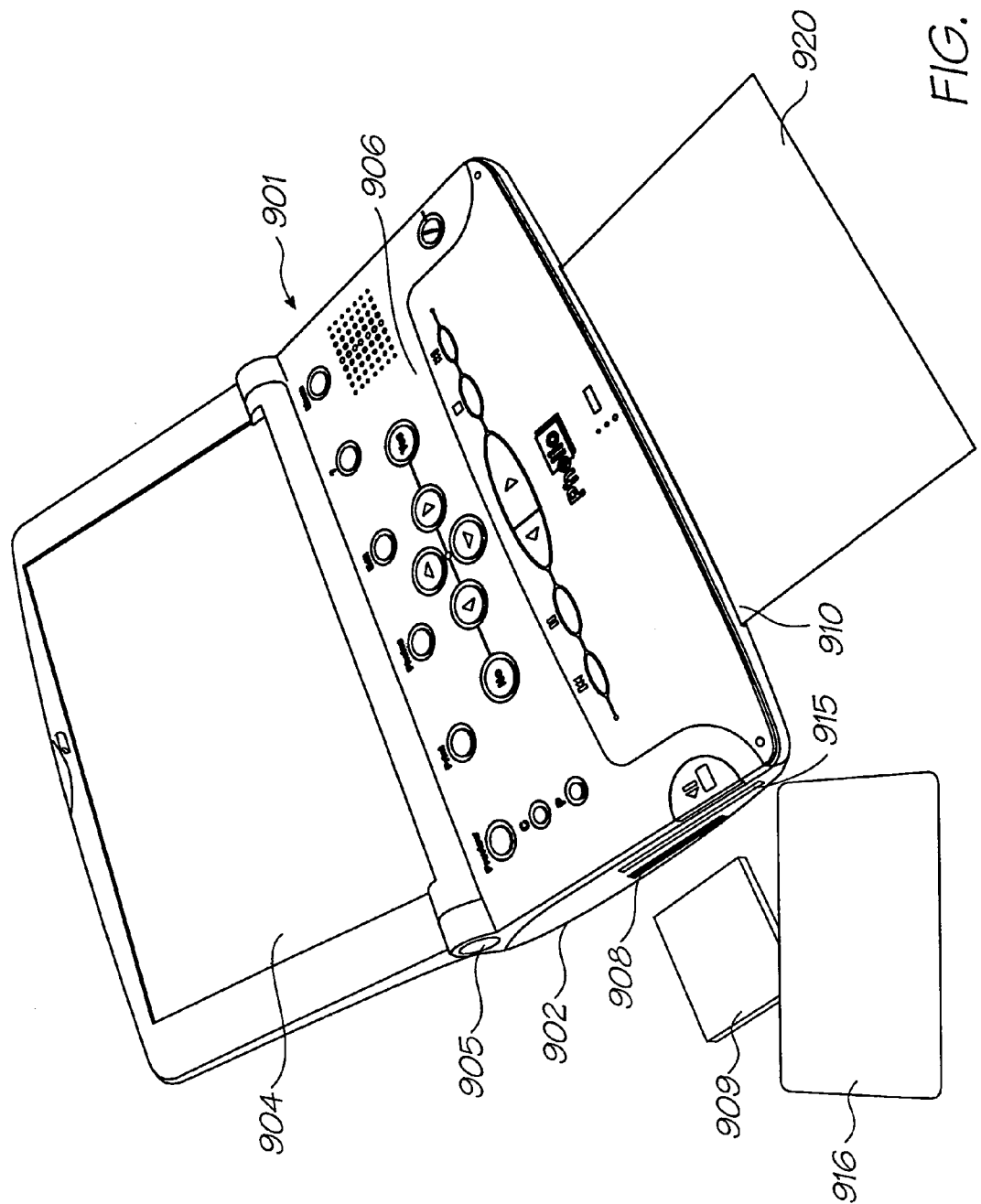
FIG. 11 shows a digital photo album having a built in printer.

In FIG. 11 there is depicted a digital photo album having an internal printer. The digital photo album 901 includes a body section 902 housing the printer and the main circuitry of the photo album. A display screen 904, preferably photo size, ie 6"×4", is pivotably connected to the body section 902 about a hinge joint 905. The screen 904 pivots between a closed position (FIG. 12) where the screen lies adjacent the body section 902 thus allowing safe transport, and an open position (FIG. 11) where the screen 904 is visible to a user.

Disposed in the side of the body 902 is a first slot 908 for receiving a memory card 909 having digital images stored on it. A second slot 915 receives an image enhancement card 916 containing a set of image modification characteristics. Within the body 902 is a memory card reader (not shown) compatible with the memory card 908 that is used to retrieve stored image data from the memory card 908. A similar card reader retrieves image modification characteristics from the image enhancement card 916.

The characteristics programmed into the image enhancement card may modify an image in any one or more of many known methods, eg. by adding standard backgrounds or text, by blurring, duplication, color modifications etc.

The body section 902 includes a control panel 906 on an upper surface thereof that includes all buttons required to operate the functions of the photo album including the functions of the printer. Using this control panel, a user can selectively view any of the images stored on the memory card 909, manipulate an image using the programmed image enhancement software, add text and/or labels and selectively print any of the displayed or stored images.

A slot 910 in the front edge of the body is used for ejecting printed images.

Figure 14:
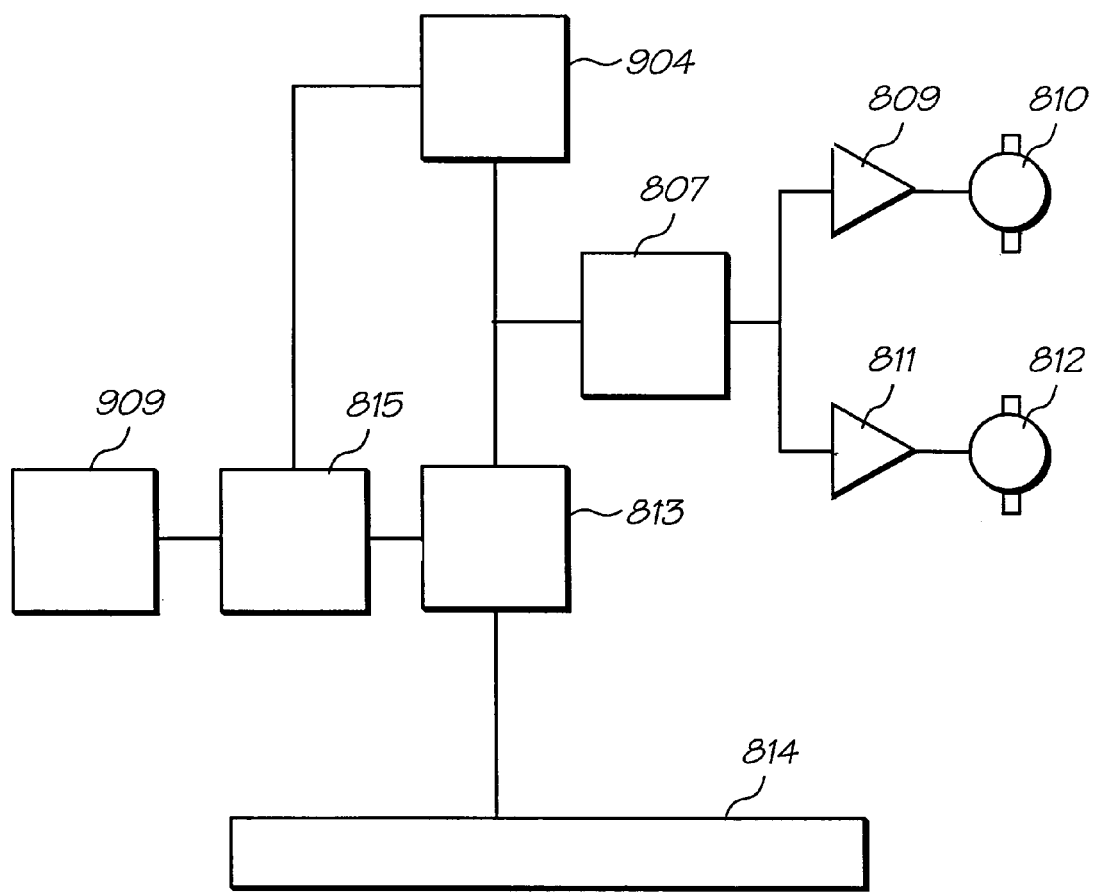
FIG. 14 is a schematic block diagram of components incorporated into a digital photo album having a built-in printer.

In FIG. 14 there is schematically depicted in block diagram form the key internal components of a digital photo album having an internal printer. The printer would typically utilize a monolithic printhead 814 which could be the same as described above with reference to FIGS. 1 to 10, but could alternatively be another compact printhead capable of printing on photograph-sized print media. Image data from the memory cards 909 runs via an image enhancement process 815 to the display screen 904. Images from the display screen 904 or the enhancement process 815 are fed to a print engine controller 813 which controls the printhead 814.

A micro-controller 807 associated with the print engine controller controls a motor driver 809 which in turn drives a media transport device 810. This might be the same as stepper motor 530 described earlier.

The micro-controller 807 also controls a motor driver 811 which in turn controls a guillotine motor 812 to sever a printed sheet from an in-built roll of print media after an image is printed. A sheet being driven by media transport device 810 is shown at 920 in FIG. 11. The guillotine might be of the form of cutter wheel 566 described earlier.

When ready, printer control buttons on the control panel can be depressed to activate the print engine controller to print a modified image either from memory or as a screen dump from the display screen. This would in turn activate the micro-controller 807 to activate the media transport 810 and guillotine 812.

Figure 12:
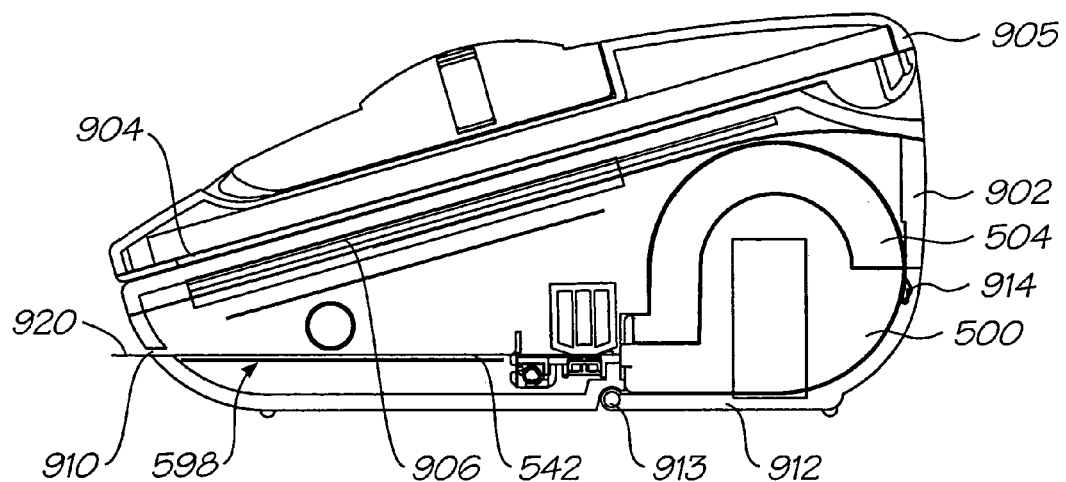
FIG. 12 shows the internal components of a digital photo album having a built in printer.

FIG. 12 shows an internal view of the digital photo album in its closed position. The printer engine 500 described previously is disposed towards the back edge of the body section 902 with the print medium passage 598 through which print media 542 passes leading to the print media ejector slot 910. Since the printer engine, and in particular the print roll cartridge 504 is the largest component within the body, placing the print engine 500 towards the back of the body results in the control panel 906 being inclined when the photo album is placed on a horizontal surface, a configuration that is comfortable for a user.

Figure 13:
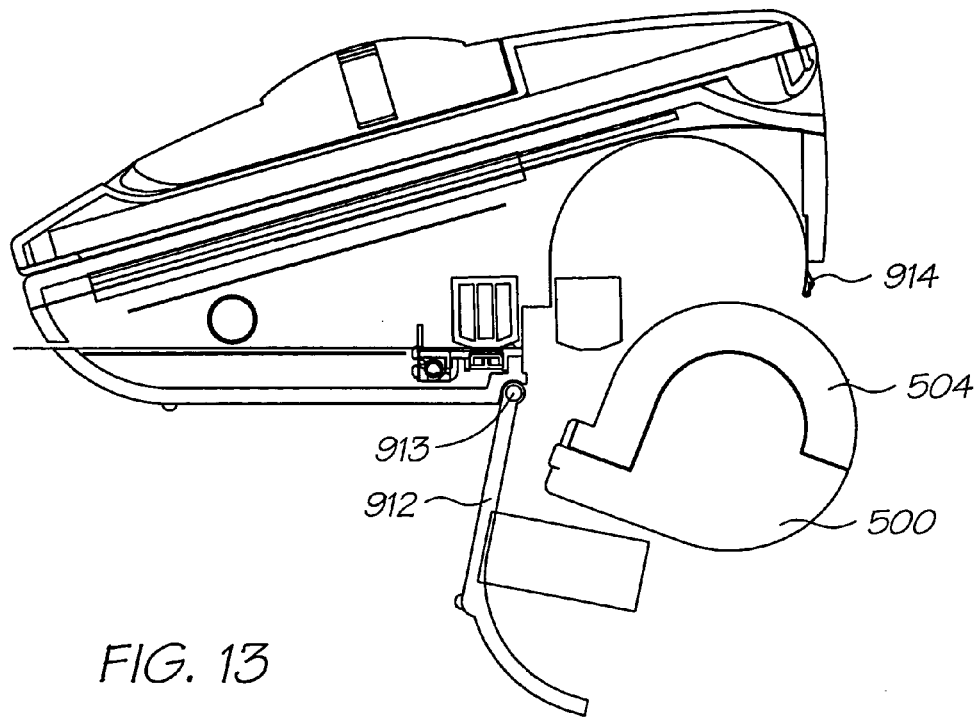
FIG. 13 shows a digital photo album with a releasable cover portion.

The body 902 includes a releasable portion 912 pivotably connected through a hinge 913 and secured in a closed position by a catch 914. Opening of this portion (FIG. 13) allows the print roll cartridge 504 to be removed. Further details of a removable print roll cartridge are described in our co-pending application docket no. CA02 mentioned earlier.

The size of the screen 904 is matched to the width of the printhead so that the displayed and printed images are equal sizes. Preferably the screen displays a regular 6"×4" photo image and the printer uses a 4" printhead.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than the foregoing description, and all changes which come within the meaning and range of equivalency of the claims are therefore intended to be embraced therein. It will further be understood that any reference herein to known prior art does not, unless the contrary indication appears, constitute an admission that such prior art is commonly known by those skilled in the art to which the invention relates.

The invention claimed is:

1. A digital photo album including:
    a built-in image storage device within a body for storing at least one image;
    an image display rotatably attached to the body for electronically displaying said at least one image;
    a built-in removable medium receiving portion provided as part of the body for receiving a removable medium for storing at least one set of instructions;
    a built-in user interface within at least a portion of the body permitting a user to enter user input;
    a built in processor within the body for modifying the at least one image in accordance with at least one of the at least one set of instructions retrieved from the removable medium and said user input to produce a modified image; and,
    a built-in printer within the body for printing the modified image, the built-in printer including a print roll, a printhead for printing the modified image onto the print roll, a cutter wheel for severing the printed modified image from the print roll, and a cutter motor for driving the cutter wheel;
    wherein the user may selectively display, print or display and print the modified image.

2. The digital photo album according to claim 1, wherein the at least one set of instructions is stored in said built-in storage device.

3. The digital photo album according to claim 1, wherein the at least one set of instructions is provided on media.

4. The digital photo album according to claim 3, wherein said media is releasably engageable with at least one reader, said at least one reader adapted for retrieving one of the at least one set of instructions from said media.

5. The digital photo album of claim 1 wherein the body includes a releasable cover portion through which at least a portion of said printer including the print roll and/or an ink cartridge can be removed.

6. The digital photo album of claim 1 wherein at least a portion of said user interface is adapted for operating said printer.

7. The digital photo album of claim 1 wherein said printer is disposed within the body such that when the digital photo album is placed on a horizontal surface at least a portion of said user interface is inclined to the horizontal.

8. The digital photo album of claim 1 wherein the size of a displayed image and the size of a printed image printed by said printer are substantially equal.

9. The digital photo album of claim 8 wherein the size of a printed image is substantially 6"×4".

10. The digital photo album of claim 1 wherein said printer includes a monolithic pagewidth printhead.

11. The digital photo album of claim 10 wherein said printhead is an ink jet printhead.

12. The digital photo album of claim 10 wherein said printhead is substantially 4" wide.

13. The digital photo album of claim 1 wherein the built-in image storage device receives the at least one image from a memory card inserted into the body.

14. A method of modifying a stored image including the steps of:
    placing a memory card containing said stored image in releasable engagement with at least one built-in reader formed within a body of a digital photo album, the digital photo album including a built-in image storage device for storing at least one image, an image display rotatably attached to the body for electronically displaying said at least one image, a built-in removable medium receiving portion provided as part of the body for receiving a removable medium for storing at least one set of instructions, a built-in user interface within at least a portion of the body permitting a user to enter user input, a built-in processor for modifying the at least one image in accordance with at least one of the at least one set of instructions retrieved from the removable medium and said user input to produce a modified image, and, built-in printer for printing the modified image, the built-in printer including a print roll, a printhead for printing the modified image onto the print roll a cutter wheel for severing the printed modified image from the print roll, and a cutter motor for driving the cutter wheel;
    retrieving the at least one set of instructions from the removable medium;
    processing the at least one set of instructions; and
    creating said modified image at least partially based on said processing the at least one set of instructions.

15. The method in accordance with claim 14, wherein the at least one set of instructions is recorded on media containing the at least one set of instructions and the media is releasably engageable with one of the at least one reader.

16. The method in accordance with claim 14, wherein the at least one set of instructions is user input entered via the user interface.

17. The method in accordance with claim 16, wherein said user interface is operated to selectively display said modified and said stored images on a display.

18. The method in accordance with claim 17, including the step of printing an image displayed.

19. The method in accordance with claim 18, wherein the printed image is the modified image.

20. The method in accordance with claim 18, wherein the printed image is the un-modified image.

* * * * *